United States Patent
Chen et al.

(10) Patent No.: US 8,650,532 B2
(45) Date of Patent: Feb. 11, 2014

(54) CHANGE NOTIFICATION AND INFORMATION UPDATE BASED ON UNCOMPILED SOFTWARE DEVELOPMENT PROJECT

(75) Inventors: John Z. Chen, Woodinville, WA (US); Weida Zhao, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 589 days.

(21) Appl. No.: 12/777,274

(22) Filed: May 11, 2010

(65) Prior Publication Data

US 2011/0283252 A1 Nov. 17, 2011

(51) Int. Cl.
*G06F 9/44* (2006.01)
*G06F 9/45* (2006.01)

(52) U.S. Cl.
USPC .......................................... 717/102; 717/164

(58) Field of Classification Search
None
See application file for complete search history.

(56) References Cited

U.S. PATENT DOCUMENTS

| | | | |
|---|---|---|---|
| 6,049,673 A * | 4/2000 | McComb et al. | 717/164 |
| 7,111,280 B2 | 9/2006 | Levien et al. | |
| 7,127,707 B1 * | 10/2006 | Mishra et al. | 717/137 |
| 7,503,034 B2 | 3/2009 | Berg et al. | |
| 2004/0117759 A1 | 6/2004 | Rippert et al. | |
| 2006/0248121 A1 | 11/2006 | Cacenco et al. | |
| 2008/0320441 A1 | 12/2008 | Ahadian et al. | |
| 2009/0063522 A1 * | 3/2009 | Fay et al. | 707/100 |
| 2009/0119638 A1 | 5/2009 | Li et al. | |
| 2011/0283256 A1 * | 11/2011 | Raundahl et al. | 717/108 |

OTHER PUBLICATIONS

Ferguson, et al., "Secure, Reliable, Transacted Web Services: Architecture and Composition", Retrieved at << http://msdn.microsoft.com/en-us/library/ms996535.aspx >>, Sep. 2003, pp. 1.

* cited by examiner

*Primary Examiner* — Hyun Nam
(74) *Attorney, Agent, or Firm* — Kevin Sullivan; Kate Drakos; Micky Minhas (57) ABSTRACT

Methods, systems, and computer-readable media are disclosed to provide change notification based on updates to an uncompiled software development project. A particular method includes detecting a project switch to a first software development project from an uncompiled second software development project. A metadata representation of one or more software entities associated with the second software development project is created. The method also includes updating a file including one or more proxy classes of the first software development project, where the proxy classes are updated based on the metadata representation. One or more clients of the first software development project are notified that the file has been updated.

20 Claims, 6 Drawing Sheets

CHANGE NOTIFICATION AND INFORMATION UPDATE BASED ON UNCOMPILED SOFTWARE DEVELOPMENT PROJECT

BACKGROUND

Software applications often include multiple components. Each component may be developed in a different software project. Although the different software projects will eventually be combined into a single application, the boundary between the different software projects may prevent design-time information exchange between the software projects. For example, changes to a first software project may not be accurately reflected at other software projects until the first software project is built (e.g., compiled from source code to executable code). However, building the first software project may be a time-consuming and resource-intensive operation. In addition, a user may forget or be unaware that the first project needs to be built. If the first software project is not in a buildable state, there may be no way to provide certain updated information regarding the first software project to the other software projects.

SUMMARY

A method of providing change notifications without compiling software development projects is disclosed. When a triggering event, such as a project switch to a first project from a second project occurs, a metadata representation of source code at the second project may be created. The metadata representation may be created without compiling the second project and may be used to generate a file (e.g., dynamic linked library (DLL)) of proxy classes. When the file is generated, the first project and clients of the first project may be notified. The file may be used by the first project and clients of the first project to display updated information regarding recent changes at the second project. For example, when changes are made to a server-side project, an associated client-side project may reflect the server-side changes without compiling of the server-side project. For example, updated information regarding the server-side project may be displayed at a data source window and a source-code definition window of an integrated development environment (IDE) associated with the client-side project.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a computer-implemented method includes detecting a project switch to a first software development project from a second software development project. For example, the first software development project may be a client-side project and the second software development project may be a server-side project. The method also includes creating a metadata representation of one or more software entities associated with the second software development project. The metadata representation is based on an uncompiled version of the second software development project. The method further includes updating one or more proxy classes of the first software development project based on the metadata representation. For example, the uncompiled version of the second software development project may be used to generate a file that is input into a proxy class generator that generates source code for the one or more proxy classes. The one or more proxy classes are stored at a portable executable file (e.g., a dynamic linked library (DLL)). The method includes notifying one or more clients of the first software development project that the file has been updated.

In another particular embodiment, a computer-readable medium includes instructions, that when executed by a computer, cause the computer to detect a triggering event associated with a server-side software development project. The instructions also cause the computer to identify one or more software entities in the server-side software development project and to create a metadata representation of the identified software entities. The metadata representation is based on an uncompiled version of the server-side software development project. The instructions further cause the computer to generate a file including one or more proxy classes of a client-side software development project. Each particular proxy class corresponds to a particular software entity. The instructions cause the computer to notify an integrated development environment (IDE) associated with the client-side software development project of the generated file and to display the one or more software entities at the IDE based on the generated file.

In another particular embodiment, a computer system includes a processor and a memory. The memory includes instructions that are configured to cause the processor to detect a project switch to a first software development project from a second software development project. The instructions also cause the processor to create a metadata representation of one or more software entities associated with the second software development project, where the metadata representation is based on an uncompiled version of the second software development project. The instructions cause the processor to generate code for one or more proxy classes of the first software development project based on the metadata representation. The instructions further cause the processor to update a library file based on the generated code and to notify one or more clients of the first software development project that the library file has been updated. The updated library file is useable by the one or more clients to display updated information associated with the second software development project. For example, the library file may be used to display documentation (e.g., automatically generated documentation files and user-entered source code comments), symbol disambiguation information (e.g., variable names, function names, and method names), and type disambiguation information (e.g., variable types, argument types, and parameter types) at a data source window or a source code definition window of an integrated development environment (IDE).

Figure 1:
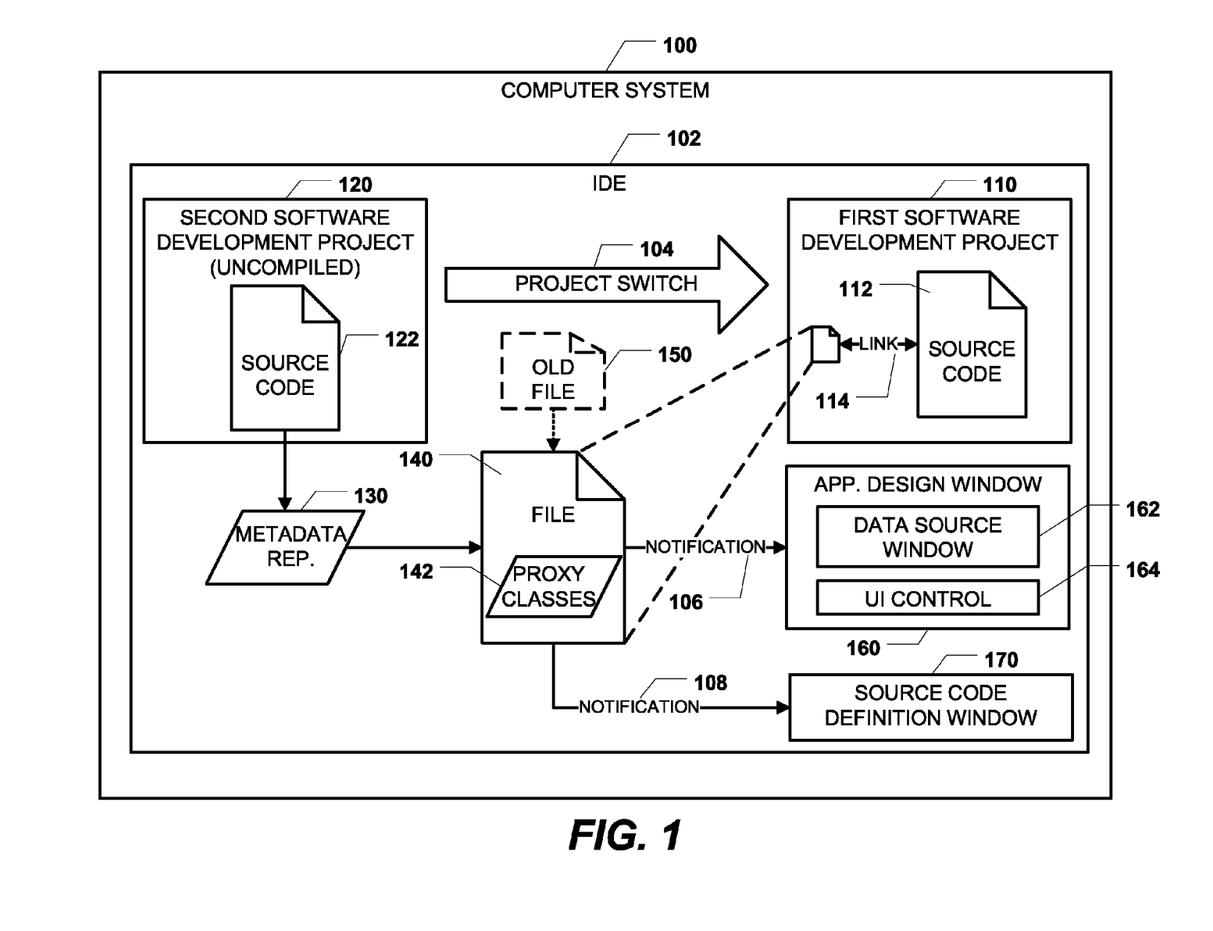
FIG. 1 is a diagram to illustrate a particular embodiment of a system of change notification based on an uncompiled software development project.

FIG. 1 is a diagram to illustrate a particular embodiment of a computer system 100 to perform change notification in response to updates to an uncompiled software development project. The computer system 100 includes a first software development project 110 and a second software development project 120. In a particular embodiment, the software development projects 110, 120 are located at an integrated development environment (IDE) 102 of the computer system 100. For example, the IDE 102 may be useable to edit and build the software development projects 110, 120 (e.g., into a multi-component software application).

Each of the software development projects 110, 120 may include one or more files (e.g., source code files, class libraries, and external objects) that can be built (e.g., compiled and linked) to form a software application. The software development projects 110, 120 may be developed concurrently at the computer system 100. For example, one or more files of source code 112 at the first software development project 110 and one or more files of source code 122 at the second software development project 120 may be open for editing at the IDE 102. In the particular embodiment illustrated in FIG. 1, the second software development project 120 is uncompiled. For example, modifications to the source code 122 may not be saved to a file that is compiled to reflect the modifications. In a particular embodiment, one of the software development projects 110, 120 is a server-side project and the other is a client-side project for a web application. For example, the server-side project may include server-side software entities and computational logic (e.g., backend processing) and the client-side project may include client-side web application components (e.g., user interfaces). It should be noted that although the particular embodiment illustrated in FIG. 1 depicts two software development projects at the same computer system, software development projects may instead be located at different computer systems (e.g., connected via a network).

During software development, a project switch 104 (e.g., based on user input) from the second software development project 120 to the first software development project 110 may occur. For example, a user of the IDE 102 may have both software development projects 110, 120 open for editing and may change an "active" project designation from the second software development project 120 to the first software development project 110. Logic at the IDE 102 (e.g., coupled to the second software development project 120) may create a metadata representation 130 of one or more software entities of the second software development project 120, including software entities that have been modified since a most recent compilation of the second software development project 120. For example, the metadata representation 130 may include representations of types, interfaces, classes, structures ("structs"), delegates, enumerated data types ("enums"), events, methods, constructors, references, expressions, parameters, and arguments of the second software development project 120. The software entities may include C# software entities, Visual Basic® software entities, and any other computer language software entities. Visual Basic® is a registered trademark of Microsoft Corp., located at One Microsoft Way, Redmond, Wash. 98052. Metadata representations of software entities are further described and illustrated with reference to FIG. 2.

Logic at the IDE 102 may also generate a file 140 based on the metadata representation 130. The file may be a portable executable file such as a dynamic linked library (DLL). Alternately, an older version 150 of the file 140 may be updated to generate the file 140. For example, the older version 150 of the file 140 may have been generated in response to a previous project switch. In a particular embodiment, the file 140 is generated directly from the metadata representation 130. In alternate embodiments, generating the file 140 may involve one or more other files such as other intermediate DLLs and an intermediate CodeDOM tree. Generating a DLL from a metadata representation is further described and illustrated with reference to FIGS. 3-4.

The file 140 includes one or more proxy classes 142 of the first software development project 110. For example, the file 140 may include source code definitions and implementations of the one or more proxy classes 142. The one or more proxy classes 142 may include a proxy class corresponding to each of the software entities of the second software development project 120 represented by the metadata representation 130. In a particular embodiment, the first software development project 110 is linked to the software development project 120 via a link 114 between the source code 112 and the file 140. For example, the link 114 between the source code 112 and the file 140 may enable linking of the source code 112 against the second software development project 120 during a build process. The link 114 may be part of the source code 112 or may be an option (e.g., compiler option) at the IDE 102. In another particular embodiment, the IDE 102 determines whether or not any of the software entities at the second software development project 120 have changed prior to updating the file 140. For example, the IDE 102 may conserve computational resources at the computer system 100 by not updating the file 140 when none of the software entities has changed.

When the file 140 is created or updated, clients (e.g., clients registered at the IDE 102) of the first software development project 110 may be notified that the file 140 has been created or updated. For example, an application design window 160 and a source code definition window 170 at the IDE 102 may each be a client of the first software development project 110. A first notification 106 may be sent to the application design window 160 and a second notification 108 may be sent to the source code definition window 170. In a particular embodiment, the application design window 160 may provide a graphical user interface (GUI)-based method to design and define software, and the source code definition window 170 may provide a text-based method to design and define software. It should be noted that clients of the first software development project 110 may also include clients outside the IDE 102.

In response to the notifications 106, 108, the application design window 160 and the source code definition window 170 may load the file 140 to display updated information (e.g., documentation information, symbol disambiguation information, and type disambiguation information) associated with the second software development project 120. For example, a data source window 162 of the application design window 160 may be updated. The data source window 162 may be useable to define user interface (UI) controls (e.g., an illustrative UI control 164). As another example, the source code definition window 170 may be updated with information from the second software development project 120. Updating a data source window is further described and illustrated with reference to FIGS. 3 and 5.

In operation, the metadata representation 130 may be generated from the source code 122 at the second software development project 120 in response to the project switch 104 from the second software development project 120 to the first software development project 110. The file 140 (and proxy classes 142 therein) may be created or updated based on the metadata representation 130. When the file 140 is created or updated, the first software development project 110 and clients of the first software development project 110 (e.g., the application design window 160 and the source code definition window 170) may be notified. Upon notification, the file 140 may be loaded by the first software development project 110, the application design window 160, and the source code definition window 170 to display updated information regarding the second software development project 120.

It will be appreciated that the computer system 100 of FIG. 1 may enable software entity change notification across multiple projects without compiling each of the multiple projects. For example, the first software development project 110, the application design window 160, and the source code definition window 170 may load the proxy classes 142 from the file 140 to obtain a "current version" (e.g., updated "design-time" version) of software entities at the second software development project 120 without compilation of the second software development project 120. It will be appreciated that an improved software development experience at the IDE 102 may thus be provided. For example, a software developer using the IDE 102 to develop the first software development project 110 may view updated documentation, symbol disambiguation information, and type disambiguation information for the second software development project 120 without compiling the second software development project 120. The updated information may be available even during times when the second software development project 120 is not in a buildable state.

Figure 2:
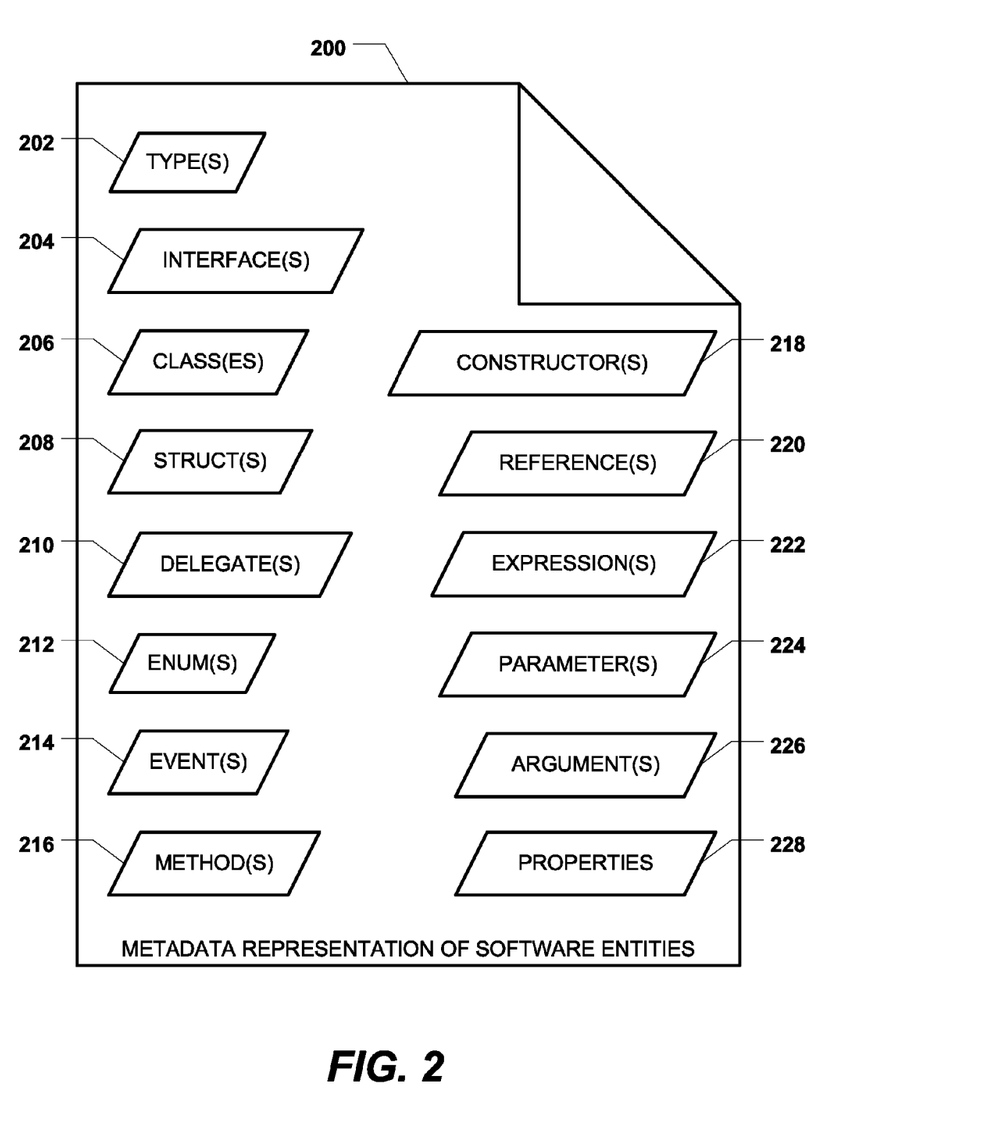
FIG. 2 is a diagram to illustrate a particular embodiment of a software entity metadata representation of the second software development project of FIG. 1.

FIG. 2 is a diagram to illustrate a particular embodiment of the metadata representation 130 of the source code 122 of FIG. 1, and generally designated 200. The metadata representation 200 may include information associated with software entities at a particular software development project (e.g., the second software development project 120 of FIG. 1). A software development project may include one or more files (e.g., source code files, class libraries, and external objects) that can be built (e.g., compiled and linked) to form a software application. The metadata representation 200 may be generated without compiling the software development project. For example, the metadata representation 200 may be generated by parsing source code files of the software development project. It should be noted that parsing the source code files (which are typically plain-text) may be faster than compiling the software development project.

The metadata representation 200 may include type metadata 202 associated with one or more types (e.g., data types) of the software development project. For example, the type metadata 202 for each particular type may include a "Base-Class" property, a "ContainingType" property, a "Members" property, a "Namespace" property, and a "TypeParameters" property.

Similarly, the metadata representation 200 may also include interface metadata 204, class metadata 206, struct metadata 208, delegate metadata 210, and enum metadata 212 associated with one or more interfaces, classes, structures, delegates, and enumerated data types of the software development project, respectively. Each of the interface metadata 204, class metadata 206, struct metadata 208, delegate metadata 210, and enum metadata 212 may include one or more properties. For example, the class metadata 206 for each particular class may include a "Constructors" property.

The metadata representation 200 may further include event metadata 214, method metadata 216, and constructor metadata 218 associated with one or more events, methods, and constructors of the software development project, respectively. Each of the event metadata 214, method metadata 216, and constructor metadata 218 may include one or more properties. For example, the method metadata 216 for each particular method may include a "Parameters" property and a "TypeParameters" property. As another example, the constructor metadata 218 may inherit from the method metadata 216 and may include the "Parameters" property and the "TypeParameters" property from the method metadata 216 in addition to "BaseArgument" and "HasBaseInitializer" properties.

The metadata representation 200 may include reference metadata 220. For example, "IDictionary<T,K>" may be a generic type and "IDictionary<string,int>" may be a reference to the generic type. The reference metadata 220 for each such reference of the software development project may include a "BaseType" property, a "FullName" property, an "IsArray" property, an "IsExplicitInterface" property, an "IsPrimitive" property, an "IsTypeParameter" property, a "Name" property, a "Rank" property, a "RegularType" property, and a "TypeArguments" property.

The metadata representation may 200 also include expression metadata 222. For example, the expression metadata 222 for each particular expression of the software development project may include a "TypeReference" property (e.g., for typed expressions) or a "Value" property (e.g., for primitive expressions).

The metadata representation 200 may further include parameter metadata 224 (e.g., for function parameters or generic types) and argument metadata 226 (e.g., for function arguments or generic types). The parameter metadata 224 may include a "Name" property and a "Type" property. The argument metadata 226 may include a "Name" property and a "Value" property. The metadata representation 200 may also include properties metadata 228 for class properties.

It will be appreciated that the metadata representation 200 of FIG. 2 may provide an updated "snapshot" of the various software entities in a software development project without requiring compilation of the software development project.

Figure 3:
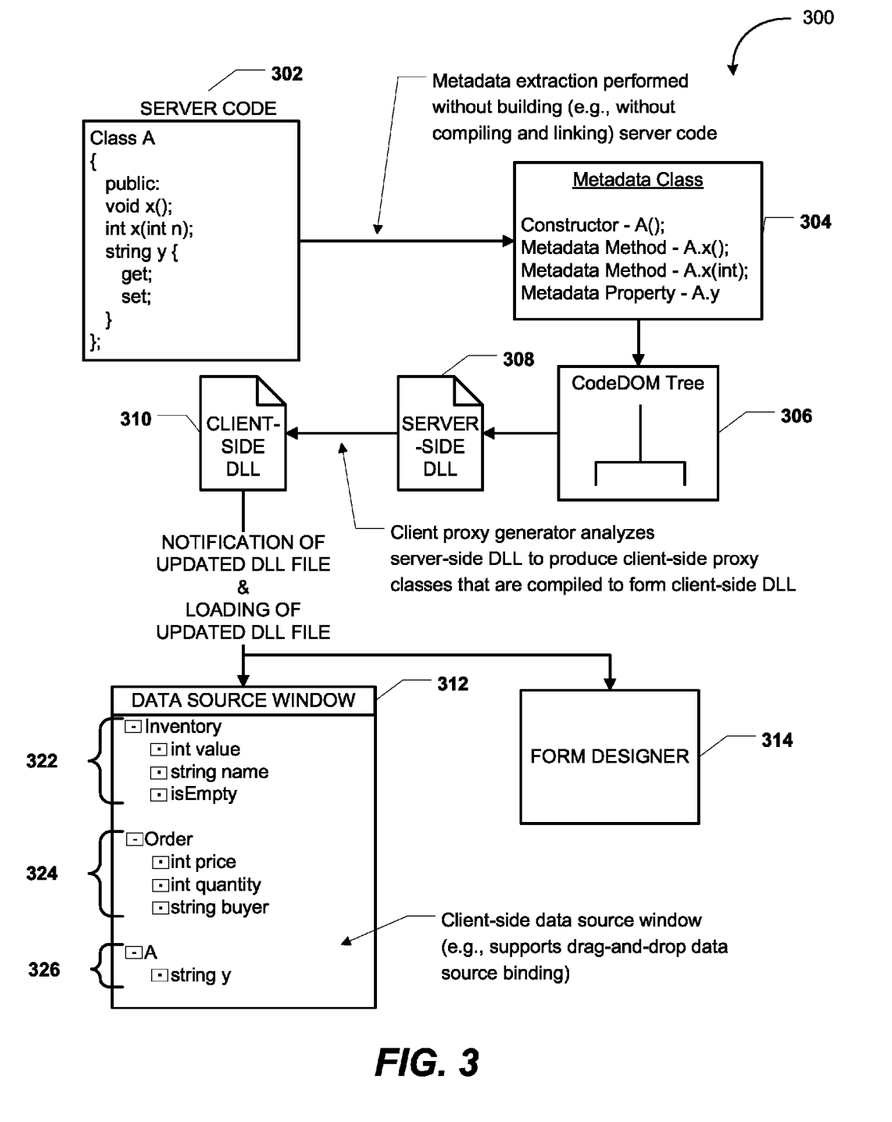
FIG. 3 is a diagram to illustrate a particular embodiment of a method of updating a data source window in response to change notification based on an uncompiled software development project.

FIG. 3 is a diagram to illustrate a particular embodiment of a method 300 of updating a data source window 312 in response to a change notification based on updates to an uncompiled software development project. For example the uncompiled software development project may be the second software development project 120 of FIG. 1.

When a triggering event, such as a project switch from a server-side project to a client-side project is detected, metadata extraction may be performed on server code 302. The metadata extraction may be performed without building the server code 302 and may result in a metadata class 304. For example, in the particular embodiment illustrated in FIG. 3, the server code 302 includes a software class "A" having two methods "x( )" and "x(int)," and a property "y." The metadata class 304 includes corresponding constructor metadata "A( )," method metadata "A.x( )" and "A.x(int)," and property metadata "A.y."

A CodeDOM tree 306 may be created at the server-side project based on the metadata class 304 and a server-side DLL 308 may be generated based on the CodeDOM tree 306.

The server-side DLL 308 may be input into a proxy class generator at the client-side project. The proxy class generator may analyze the server-side DLL 308 to produce client-side proxy classes that are compiled to form a client-side DLL 310. Compiling proxy classes (which are typically lightweight) to form a client-side DLL is typically a faster process than compiling a server-side project. When the client-side DLL 310 is formed, clients of the client-side project may be notified. For example, a client-side data source window 312 may be notified. In an illustrative embodiment, the data source window 312 is the data source window 162 of FIG. 1.

The data source window 312 may display information associated with client code. For example, the data source window 312 may display information associated with a client-side "Inventory" class 322 and a client-side "Order" class 324. Upon receiving the notification, the data source window 312 may load the client-side DLL 310 and display updated information for the server code 302. For example, the data source window 312 may additionally display selected information for the server-side "A" class 326. In a particular embodiment, the data source window 312 supports drag-and-drop data binding between client-side and server-side software entities. For example, members of the server-side "A" class may be dragged from the data source window 312 and dropped into an application design window to automatically bind the members of the server-side "A" class to client-side code (e.g., a UI control (e.g., the UI control 164 of FIG. 1) that includes members of the client-side "Inventory" and "Order" classes). Alternately, the UI control may automatically be generated and bound to members of the server-side "A" class. In a particular embodiment, the data source window 312 displays property information (e.g., information regarding "A.y") but not method information (e.g., information regarding "A.x( )" and "A.x(int).".

A form designer 314 may also be notified that the client-side DLL 310 has been formed. For example, if a new property is added to a type in the server code 302, the form designer 314 may recognize the new property after receiving the notification and may display updated type information associated with the server code 302.

It should be noted that although the particular embodiment illustrated in FIG. 3 illustrates notification based on updates to an uncompiled version of a single software development project, notifications may instead be generated for multiple software development projects. For example, the data source window 312 may be notified when each of multiple server projects is updated, and may load client-side DLLs for each of the multiple server projects. It should also be noted that other embodiments may not generate the client-side DLL 310. For example, a client-side proxy class source file may instead be generated by an IDE based on the server-side DLL 308. The IDE may then perform a background compilation of the client-side proxy class source file to generate in-memory compiled code representing the proxy classes.

It will be appreciated that the method 300 of FIG. 3 may enable a data source window to display updated information from multiple software development projects, including uncompiled software development projects.

Figure 4:
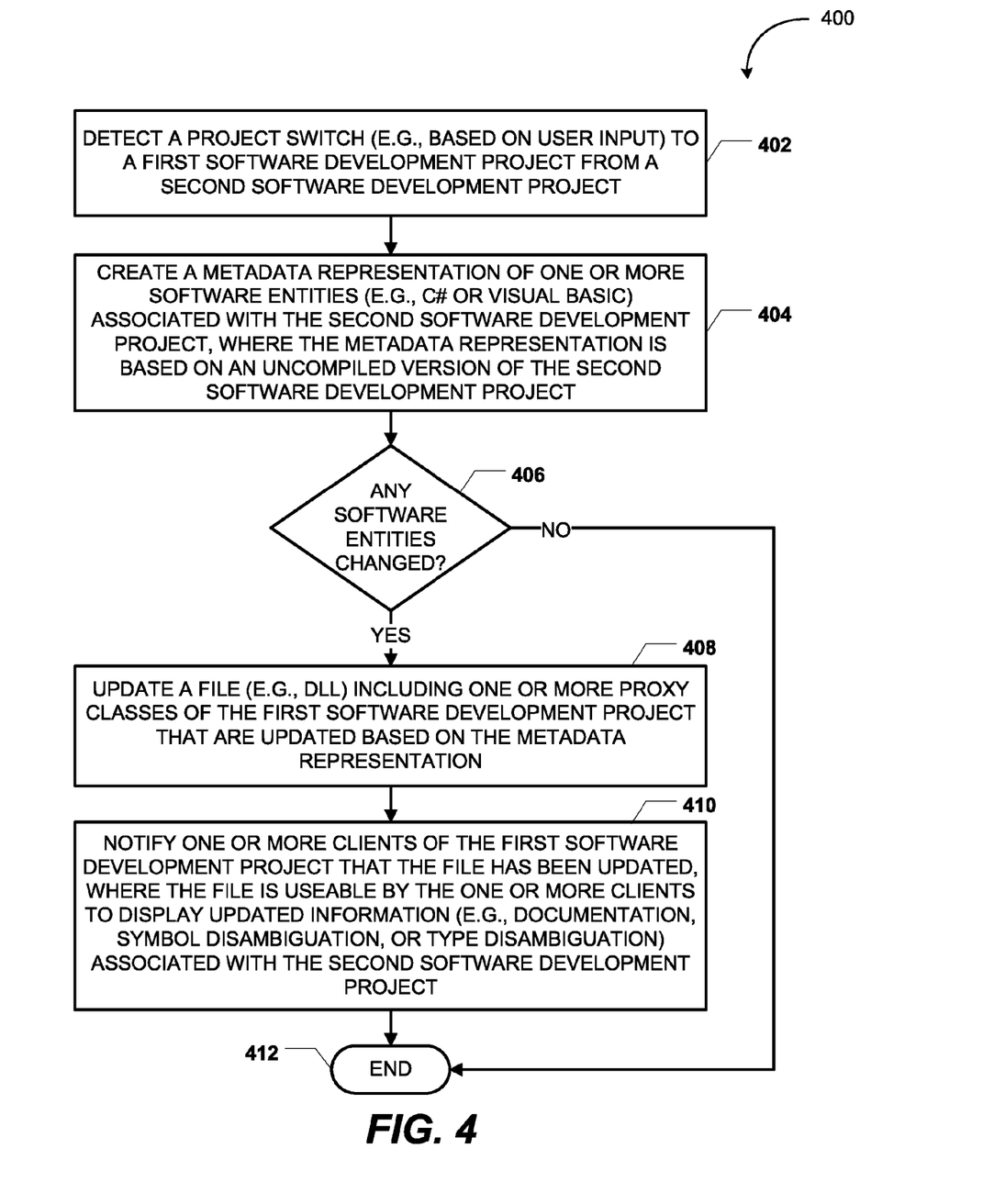
FIG. 4 is a flow diagram to illustrate a particular embodiment of a method of change notification based on updates to an uncompiled software development project.

FIG. 4 is a flow diagram to illustrate a particular embodiment of a method 400 of change notification based on updates made to an uncompiled software development project. In an illustrative embodiment, the method 400 may be performed at the computer system 100 of FIG. 1.

The method 400 includes detecting a project switch to a first software development project from a second software development project, at 402. In a particular embodiment, the project switch is based on user input (e.g., the second software development project may have previously been designated an "active" project and a user may change the "active" project designation to the first software development project). For example, in FIG. 1, the project switch 104 may be detected.

The method 400 also includes creating a metadata representation of one or more software entities associated with the second software development project, at 404. The metadata representation is based on an uncompiled version of the second software development project 404. In a particular embodiment, the one or more software entities include C# software entities, Visual Basic® software entities, and other language software entities. For example, in FIG. 1, the metadata representation 130 may be created based on an uncompiled version of the source code 122.

The method 400 further includes determining whether any of the one or more software entities has changed (e.g., since a previous project switch), at 406. When none of the software entities has changed, the method 400 ends, at 412. When at least one of the software entities has changed, the method 400 includes updating a file including one or more proxy classes of the first software development project, at 408. Each proxy class may correspond to a software entity at the second software development project. The proxy classes may enable display of documentation, symbol disambiguation information, and type disambiguation information for the software entities of the second software development project at the first software development project. The proxy classes are updated based on the metadata representation. In a particular embodiment, the file is a DLL. For example, in FIG. 1, the old version 150 of the file 140 may be updated, resulting in the file 140.

The method 400 includes notifying one or more clients of the first software development project that the file has been updated, at 410. The file is useable by the one or more clients to display updated information associated with the second software development project. In a particular embodiment, the updated information includes documentation, symbol disambiguation information, and type disambiguation information. For example, in FIG. 1, the application design window 160 and the source code definition window 170 may be notified. The method 400 ends, at 412.

Figure 5:
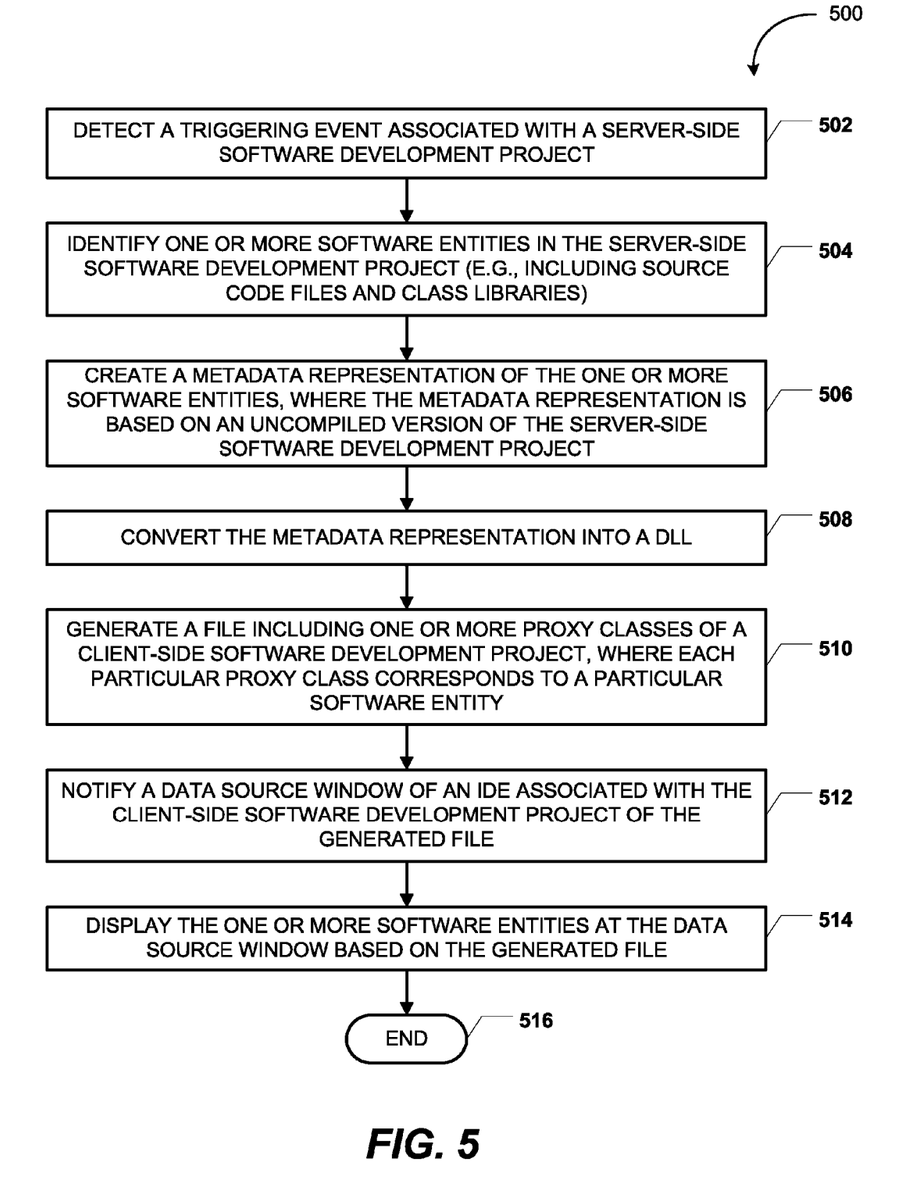
FIG. 5 is a flow diagram to illustrate another particular embodiment of a method of change notification based on updates to an uncompiled software development project.

FIG. 5 is a flow diagram to illustrate another particular embodiment of a method 500 of change notification based on updates to an uncompiled software development project. In an illustrative embodiment, the method 500 may be performed at the computer system 100 of FIG. 1 and may be illustrated with reference to FIG. 3.

The method 500 includes detecting a triggering event associated with a server-side software development project, at 502. For example, in FIG. 1, the project switch 104 may be detected. The method 500 also includes identifying one or more software entities in the server-side software development project, at 504. In a particular embodiment, the server-side development project includes source code files as well as class libraries. For example, in FIG. 1, software entities in the source code 122 may be identified.

The method 500 further includes creating a metadata representation of the one or more software entities, where the metadata representation is based on an uncompiled version of the server-side software development project, at 506. For example, in FIG. 1, the metadata representation 130 may be created based on an uncompiled version of the source code 122.

The method 500 includes converting the metadata representation into a DLL, at 508. For example, in FIG. 1, the metadata representation 130 may be converted into an intermediate server-side DLL, as described with reference to the server-side DLL 308 of FIG. 3.

The method 500 also includes generating a file including one or more proxy classes of a client-side software development project, where each particular proxy class corresponds to a particular software entity, at 510. For example, in FIG. 1, the file 140 may be generated. In an illustrative embodiment, the file 140 is generated as described with reference to the client-side DLL 310 of FIG. 3.

The method 500 further includes notifying a data source window of an IDE associated with the client-side software development project of the generated file, at 512. For example, in FIG. 1, the data source window 162 may be notified. In an illustrative embodiment, the data source window is notified as described with reference to the data source window 312 of FIG. 3.

The method 500 includes displaying the one or more software entities at the data source window based on the generated file, at 514. For example, in FIG. 1, the data source window 162 may display the one or more software entities of the second software development project 120. In an illustrative embodiment, the data source window displays the one or more software entities as described with reference to the displayed information for the server-side "A" class 326 of FIG. 3. The method 500 ends, at 516.

Figure 6:
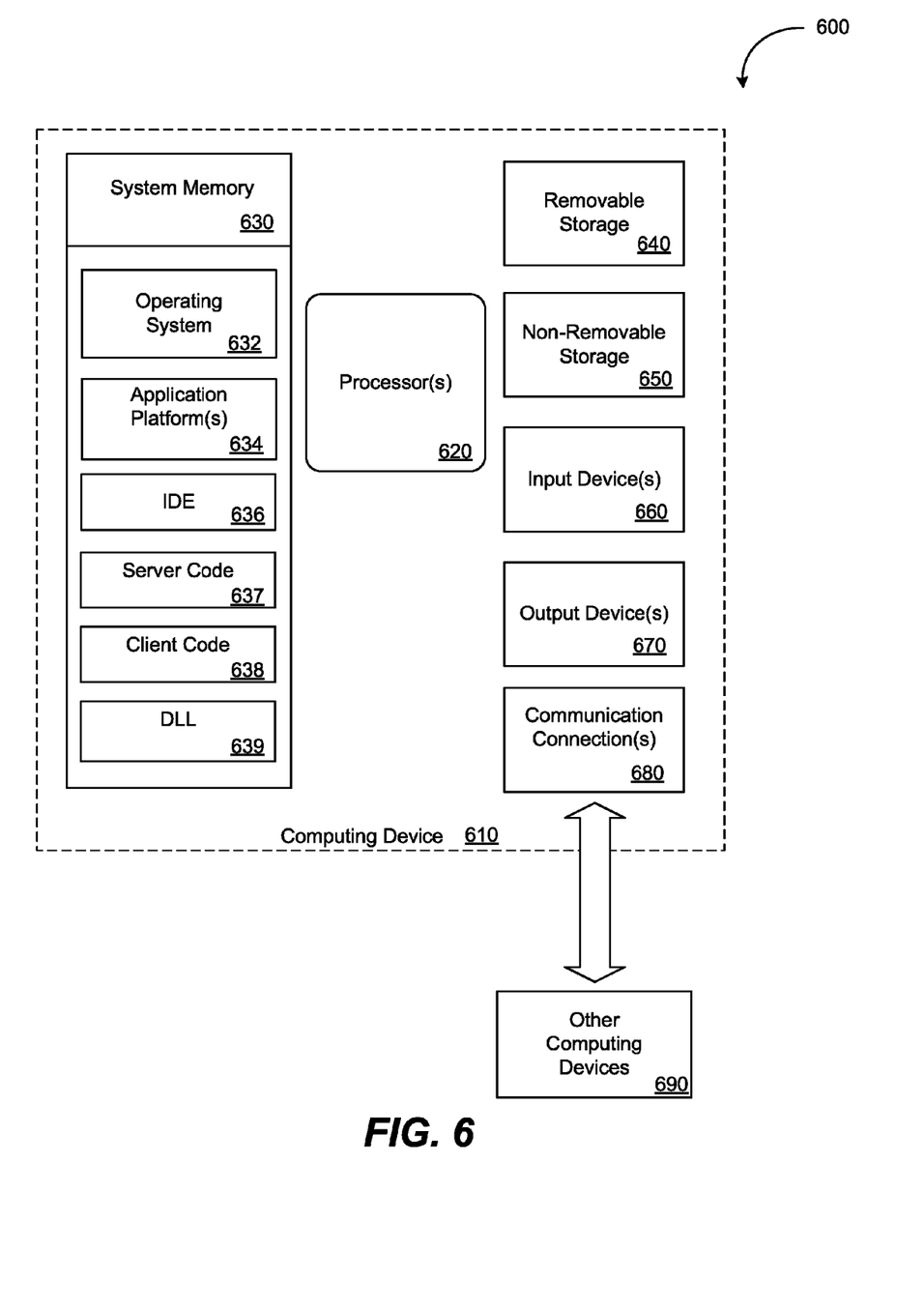
FIG. 6 is a block diagram of a computing environment including a computing device operable to support embodiments of computer-implemented methods, computer program products, and system components as illustrated in FIGS. 1-5.

FIG. 6 depicts a block diagram of a computing environment 600 including a computing device 610 operable to support embodiments of computer-implemented methods, computer program products, and system components according to the present disclosure. In an illustrative embodiment, the computing device 610 may include the computer system 100 of FIG. 1 or components thereof. Each component of the computer system 100 of FIG. 1 may include or be implemented using the computing device 610 or a portion thereof.

The computing device 610 includes at least one processor 620 and a system memory 630. Depending on the configuration and type of computing device, the system memory 630 may be volatile (such as random access memory or "RAM"), non-volatile (such as read-only memory or "ROM," flash memory, and similar memory devices that maintain stored data even when power is not provided), or some combination of the two. The system memory 630 typically includes an operating system 632, one or more application platforms 634, one or more applications, and program data. For example, the system memory 630 may include an IDE 636 useable to edit and build server code 637 and client code 638. The system memory 630 may also include a DLL 639. In an illustrative embodiment, the IDE 636 is the IDE 102 of FIG. 1, the server code 637 includes the source code 122 of FIG. 1, the server code 302 of FIG. 3, or the server code 402 of FIG. 4, and the client code 638 includes the source code 112 of FIG. 1. In another illustrative embodiment, the DLL 639 includes the file 140, the server-side DLL 308 of FIG. 3, the client-side DLL 310 of FIG. 3, the server-side DLL 408 of FIG. 4, or the client-side DLL 410 of FIG. 4.

The computing device 610 may also have additional features or functionality. For example, the computing device 610 may also include removable and/or non-removable additional data storage devices such as magnetic disks, optical disks, tape, and standard-sized or flash memory cards. Such additional storage is illustrated in FIG. 6 by removable storage 640 and non-removable storage 650. Computer storage media may include volatile and/or non-volatile storage and removable and/or non-removable media implemented in any technology for storage of information such as computer-readable instructions, data structures, program components or other data. The system memory 630, the removable storage 640 and the non-removable storage 650 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 610. Any such computer storage media may be part of the computing device 610.

The computing device 610 may also have input device(s) 660, such as a keyboard, mouse, pen, voice input device, touch input device, etc. Output device(s) 670, such as a display, speakers, printer, etc. may also be included. In an illustrative embodiment, the input device(s) 660 and the output device(s) 670 may enable interaction with the IDE 636. For example, the input device(s) 660 may enable a project switch at the IDE 636 (e.g., the project switch 104 of FIG. 1).

The computing device 610 also contains one or more communication connections 680 that allow the computing device 610 to communicate with other computing devices 690 over a wired or a wireless network.

It will be appreciated that not all of the components or devices illustrated in FIG. 6 or otherwise described in the previous paragraphs are necessary to support embodiments as herein described. For example, the removable storage 640 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-implemented method, comprising:
    detecting, at a computer, a project switch to a first software development project from a second software development project;
    creating a metadata representation of one or more software entities of the second software development project, by the computer, wherein the metadata representation is based on an uncompiled version of source code of the second software development project, where the metadata representation includes one or more properties, the properties useable with proxy classes;
    updating a file comprising one or more proxy classes of the first software development project based on the metadata representation, wherein the file is updated by at least one of:
        updating the one or more proxy classes based on the one or more properties, and
        generating a proxy class based on the one or more properties; and
    notifying one or more clients of the first software development project that the file has been updated.

2. The computer-implemented method of claim 1, wherein the updated file is useable by the one or more clients to display updated information associated with the second software development project.

3. The computer-implemented method of claim 2, wherein the updated information displayed by the one or more clients comprises documentation for the one or more software entities.

4. The computer-implemented method of claim 2, wherein the updated information displayed by the one or more clients comprises symbol disambiguation information, type disambiguation information, or any combination thereof.

5. The computer-implemented method of claim 1, wherein the second software development project is a server-side project.

6. The computer-implemented method of claim 5, wherein the server-side project is a web application project comprising the one or more software entities and computational logic associated with the one or more software entities.

7. The computer-implemented method of claim 1, wherein the first software development project is a client-side project.

8. The computer implemented method of claim 7, wherein the client-side project comprises one or more web application components.

9. The computer-implemented method of claim 1, wherein the one or more software entities comprise a type, an interface, a class, a structure, a delegate, an enumerated data type, an event, a method, a constructor, a reference, an expression, a parameter, an argument, a property, or any combination thereof.

10. The computer-implemented method of claim 1, wherein the first software development project includes a link to the second software development project.

11. The computer-implemented method of claim 1, wherein the project switch is determined based on user input.

12. The computer-implemented method of claim 1, further comprising determining whether the one or more software entities associated with the second software development project have changed prior to updating the file.

13. The computer-implemented method of claim 1, wherein the file is a dynamically linked library (DLL).

14. The computer-implemented method of claim 1, wherein the project switch occurs at an integrated development environment (IDE) associated with the first software development project and the second software development project.

15. The computer-implemented method of claim 14, wherein the one or more clients include a source code definition window of the IDE, a data source window of the IDE, or any combination thereof.

16. The computer-implemented method of claim 1, wherein the one or more software entities include C# software entities, visual basic software entities, or any combination thereof.

17. A computer-readable storage device comprising instructions, that when executed by a computer, cause the computer to:
    detect a triggering event associated with a server-side software development project;
    identify one or more software entities in the server-side software development project;
    create a metadata representation of the identified one or more software entities, wherein the metadata representation is based on an uncompiled version of the server-side software development project, and wherein the metadata representation includes one or more properties that are useable with proxy classes;
    generate a file comprising one or more proxy classes of a client-side software development project, wherein the file is generated by at least one of:
        updating the one or more proxy classes based on the one or more properties, and
        generating a proxy class based on the one or more properties; and
    wherein each particular proxy class of the one or more proxy classes corresponds to a particular software entity of the one or more software entities;
    notify an integrated development environment (IDE) associated with the client-side software development project of the generated file; and
    display the one or more software entities at the IDE based on the generated file.

18. The computer-readable storage device of claim 17, wherein the metadata representation is converted to an intermediate CodeDOM tree that is useable to generate the file.

19. An apparatus, comprising:
a processor and a memory comprising instructions configured to cause the processor to:
detect a project switch to a first software development project from a second software development project;
create a metadata representation of one or more software entities of the second software development project, wherein the metadata representation is based on an uncompiled version of at least one of library files and source code of the second software development project, and wherein the metadata representation includes one or more properties that are useable with proxy classes;
generate code for one or more proxy classes of the first software development project based on the metadata representation, wherein the code is generated by at least one of:
updating the one or more proxy classes based on the one or more properties, and
generating a proxy class based on the one or more properties;
update a library file based on the generated code; and
notify one or more clients of the first software development project that the library file has been updated,
wherein the updated library file is useable by the one or more clients to display updated information associated with the second software development project.

20. The apparatus of claim 19, wherein the second software development project metadata representation is based on a plurality of files including a combination of class library files and source code files.

* * * * *